Nov. 17, 1953 — L. C. ARGYLE — 2,659,182
SIZE CONTROL OF LINEAR BODIES
Filed Oct. 23, 1947 — 4 Sheets-Sheet 1
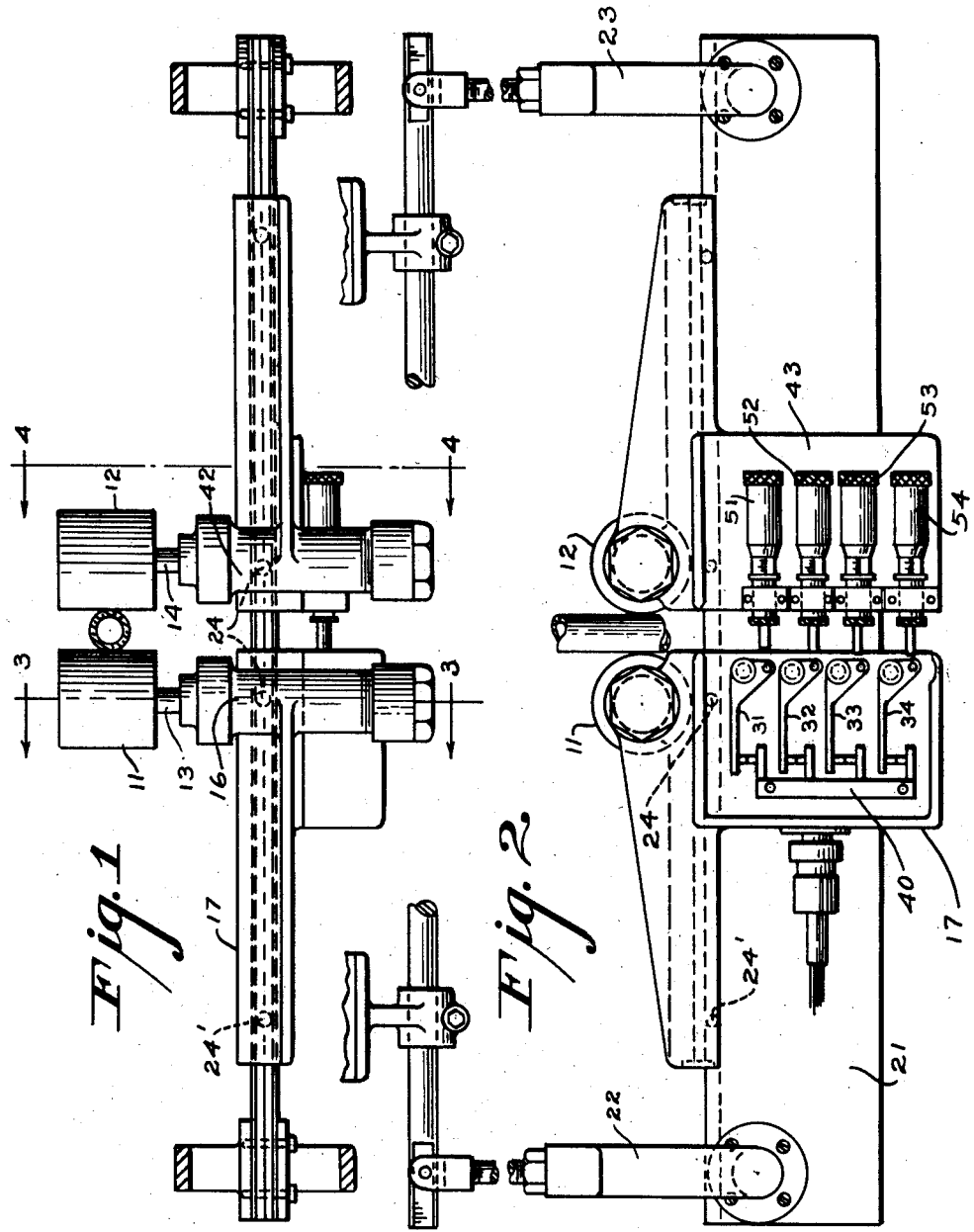
INVENTOR
LEROY C. ARGYLE
BY
ATTORNEY Nov. 17, 1953  L. C. ARGYLE  2,659,182
SIZE CONTROL OF LINEAR BODIES
Filed Oct. 23, 1947  4 Sheets-Sheet 2

Inventor
LEROY C. ARGYLE
By
Attorney

Patented Nov. 17, 1953

2,659,182

UNITED STATES PATENT OFFICE 2,659,182

SIZE CONTROL OF LINEAR BODIES

Leroy C. Argyle, Elmira, N. Y., assignor to Corning Glass Works, Corning, N. Y., a corporation of New York Application October 23, 1947, Serial No. 781,575

7 Claims. (Cl. 49—17.1)

The present invention relates to the continuous production of linear bodies of thermoplastic material, and has for its object attainment of greater uniformity in thickness of such bodies than realized by former methods. By way of example, the invention is herein applied to the continuous production of glass tubing from a molten supply body in known manner; for example, by a structure such as shown in Patent 2,085,245 granted to William J. Woods June 29, 1937, wherein the tubing is drawn upward from a molten supply body and compressed air supplied to the bore thereof, as required to maintain a desired cross-sectional diameter.

In accordance with the invention, the tubing is gauged near the source of the draw, and in response to thickness variations still well within acceptable tolerances, the gauging device initiates changes in the volume of air supplied in small increments until the tubing is of a thickness within a predetermined narrower range of tolerances. It is recognized that in the continuous production of tubing, from time to time foreign bodies enter the stream and when a section of the tubing containing such a body passes the gauging device, a momentary indication will be given of a needed corrective adjustment. Corrective adjustments under these circumstances are, however, prevented by a timing device which delays the initiation of corrective adjustments until the need for a corrective adjustment has persisted for a predetermined time interval.

In the accompanying drawings Fig. 1 is a plan view of a gauging apparatus embodying the invention, with part of the supporting means therefor shown in section and showing a section of tubing between its gauging rollers.

Fig. 2 is a side elevation of the gauging apparatus showing the overhead support therefor. The figure also shows a section of tubing between the gauging rollers.

Figure 3:
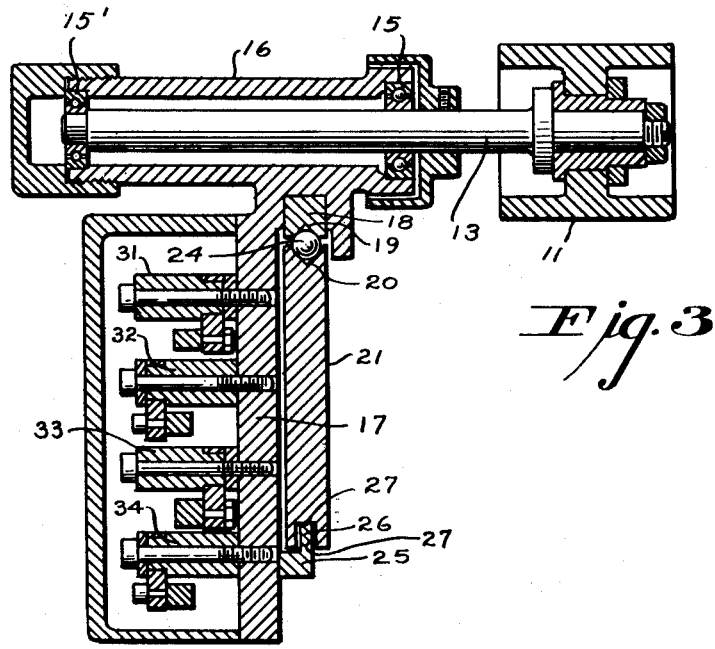
Fig. 3 is an enlarged sectional view taken on line 3—3 of Fig. 1.
Figure 4:
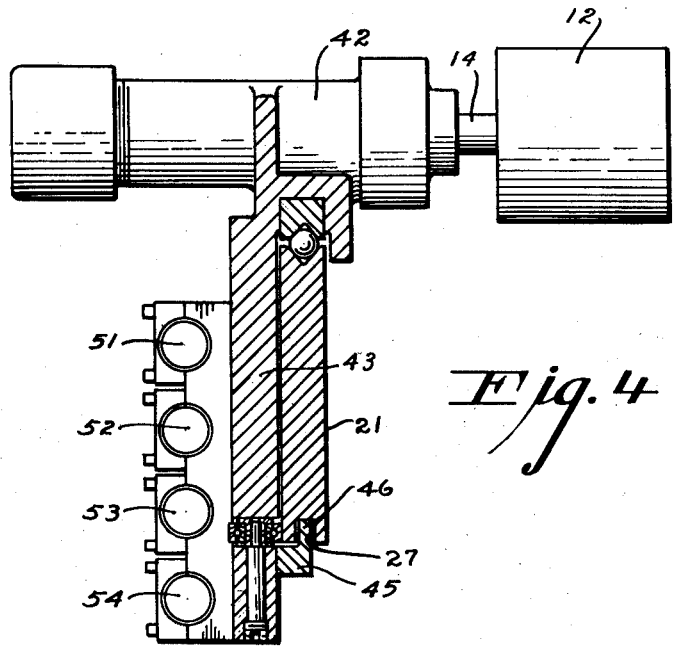
Fig. 4 is an enlarged sectional view taken on line 4—4 of Fig. 1.
Figure 5:
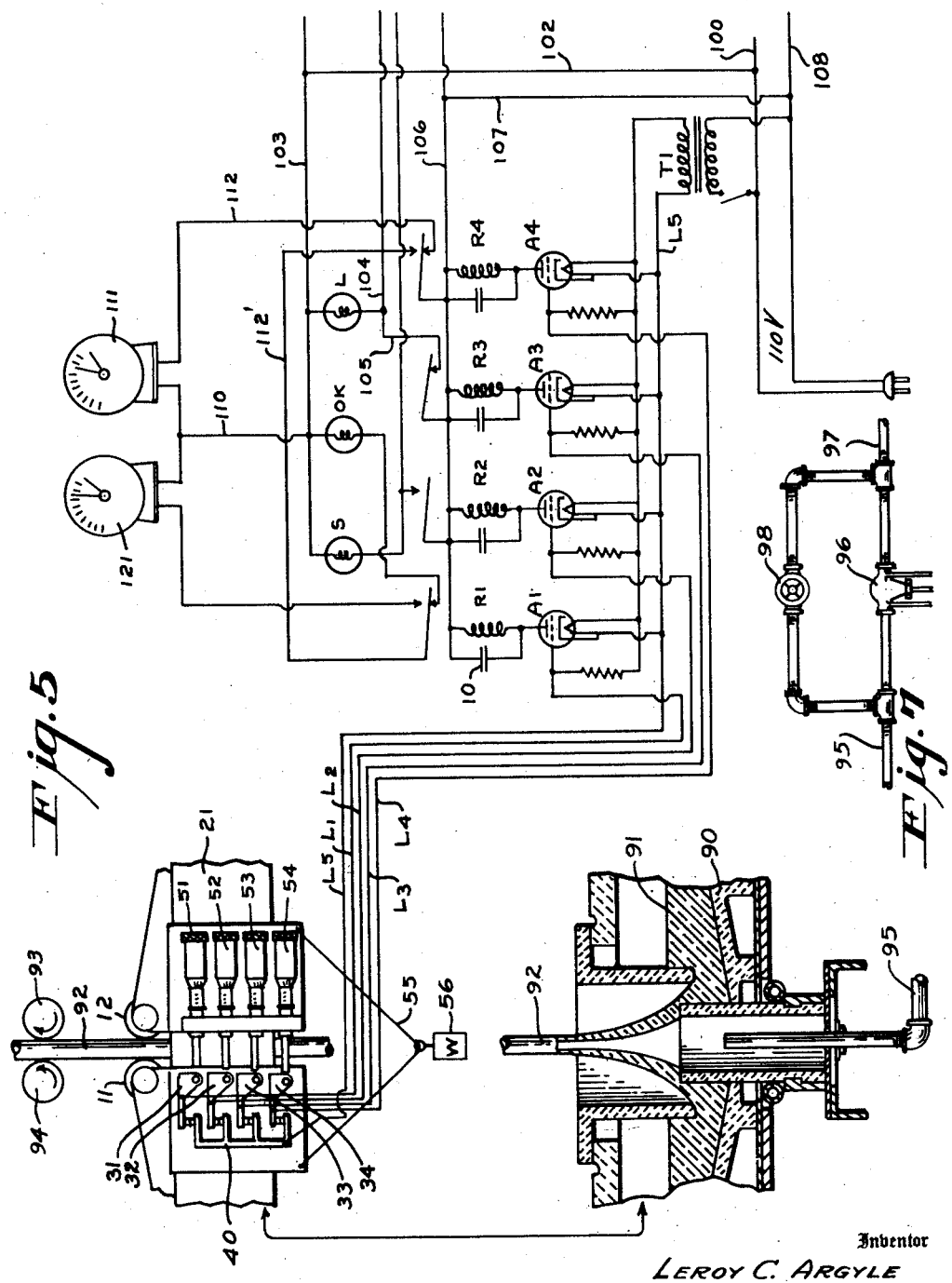

The left portion of Fig. 5 shows in sectional elevation a fragment of the tube-drawing apparatus disclosed in the cited Woods patent, having associated therewith tubing drawn from such apparatus and the gauging apparatus shown in detail in Figs. 1-4.

Figure 6:
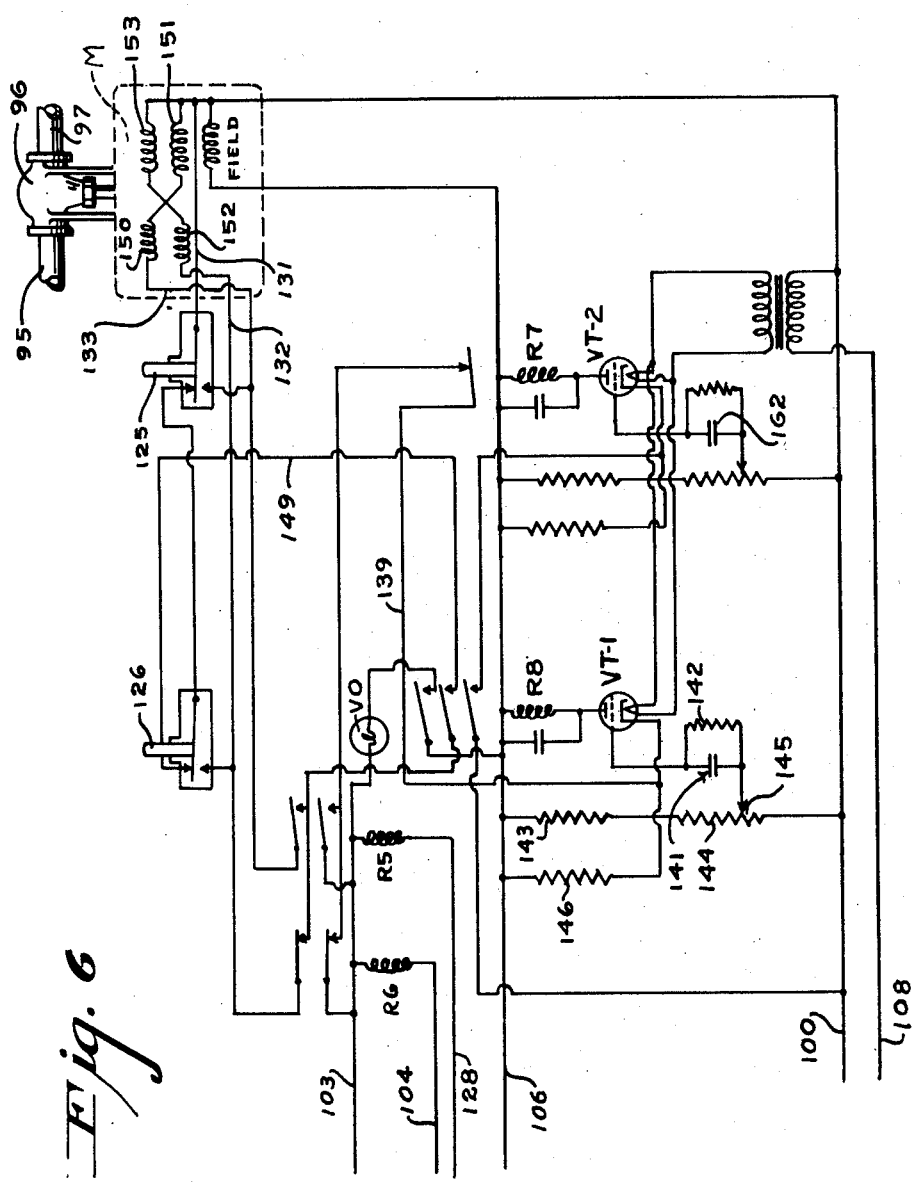

The right portion of Fig. 5, together with Fig. 6, illustrate circuits under the control of the gauging apparatus and a motor-driven air supply valve for the drawing apparatus under the control of such circuits.

Fig. 7 illustrates an alternative arrangement for supplying air to the bore of the tubing being drawn.

Gauging apparatus

Referring now to the drawings in detail, and particularly to Figs. 1-4, the gauging apparatus comprises rollers 11 and 12 carried on axle shafts 13 and 14. The shaft 13 is mounted in ball bearing assemblies 15 and 15' (Fig. 3), carried in a suitable housing 16 having a depending switch supporting bracket 17. Arranged on the underside of housing 16 and extending in a horizontal plane transverse to axle 13, is a bar 18 having an inverted V-groove 19. Facing V-groove 19 is a V-groove 20 in the upperside of a supporting track 21 suspended from suitable hangers 22 and 23, as illustrated in Fig. 2. The unitary structure comprising housing 16 and switch support 17 is supported on ball bearings 24 and 24' arranged in the space between V-grooves 19 and 20, so that the housing 16 is freely movable along the length of support 21. To prevent possible swinging movement of the housing 16 out of a horizontal plane, support 17 is provided with a key 25 (Fig. 3) having an extension 26 occupying a groove 27 in the bottom of support 21. Pivotally mounted on the side of depending portion 17 opposite support 21 are switch arms 31—34 suitably insulated from one another and each having a break contact normally engaging a similar contact carried by a suitable support 40 (Figs. 2 and 5).

The axle shaft 14 (Figs. 1 and 4) is mounted in the same manner as is shaft 13 in a similar housing 42 having a depending micrometer support 43, held against swinging movement by a key 45 having an extension 46 occupying groove 27. The structure comprising parts 42 and 43 is also mounted for free movement over support 21 in the same manner as is the structure comprising parts 16 and 17. The support 43 has mounted thereon micrometers 51—54 (Figs. 2 and 4) arranged in operative relation with switch members 31—34, and so adjusted that when tubing below a predetermined maximum diameter passes between rollers 11 and 12, the micrometer 54 will engage switch member 34 and break a circuit between it and the associated contact carried by member 40. Micrometers 53, 52 and 51 are adjusted to operate the switches associated with them as tubing of progressively smaller diameters passes between rollers 11 and 12, as will be more fully brought out hereinafter. The means for maintaining the rollers 11 and 12 in engagement with the tubing, irrespective of its size, comprises a Y-toggle 55 and a cooperative weight 56, as illustrated in Fig. 5.

*Drawing apparatus*

The drawing apparatus as illustrated comprises a refractory bowl 90 containing a molten supply body of glass 91, from the upper surface of which tubing 92 is drawn by suitable tractor rolls 93 and 94. The tube diameter is controlled by supplying positive air pressure to its bore from a supply pipe 95 to which air is supplied from a line 97 under control of a motor actuated valve 96, illustrated in Fig. 6.

*Indicating equipment*

Equipment is provided for indicating whether the tubing being drawn is within an ideal tolerance range, is acceptable but smaller than ideal, is acceptable but larger than ideal, is too small, or is too large. Clocks are also provided for measuring time periods during which the tubing is either too large or too small.

The control of this equipment is by means of a group of relays R1—R4 in turn under control of the gauging apparatus. Relay R1, for example, is maintained energized over a circuit extending from the conductor 108 of a 110-volt alternating current supply source, conductor 107, conductor 106, the winding of relay R1, and the plate of an amplifier tube A1. The relay is energized during the positive half-cycle charges received over this circuit and is held energized during the negative half cycle by a charge stored in the associated condenser 10. Positive charges are supplied to the relay R1 so long as the grid of tube A1 remains connected to the line L5 leading from a transformer T1. This circuit extends through the member 40, switch arm 31, and line L1 to the grid of the tube. Similar circuits for maintaining relays R2—R4 energized include branches extending through the switch arms 32—34, lines L2—L4 and the grids of amplifier tubes A2—A4. The micrometers 51—54 are so adjusted that when the tubing passing between gauging rollers 11 and 12 is too large, all of the relays R1—R4 will be energized. When the tubing is oversize but acceptable, micrometer 54 will actuate the switch arm 34 to open the circuit to the grid of tube A4 and thereby bring about the de-energization of relay R4. As progressively smaller sizes of tubing pass between rollers 11 and 12, micrometers 53—51 will open the circuits to the grids of tubes A3—A1 to effect the successive de-energization of relays R3—R1.

With relays R1—R4 all energized, a circuit extends from conductor 100 through conductors 102, 103, a lamp L, conductors 104 and 105, the contacts of relay R3, conductors 106, 107, to the conductor 108, so that lamp L lights up and indicates that the tubing being drawn is too large. At the same time a circuit is established over conductors 107, 106, the front contact on relay R4, conductor 112, through the clock 111 to conductor 110, and through conductors 103, 102, to conductor 100, so that this clock times the period during which the tubing being gauged is too large.

When the tubing being gauged is larger than ideal but acceptable, relay R4 is de-energized, at its front contact breaks the traced circuit for the clock 111, and at its back contact establishes a circuit over conductor 112' through the front contact of relay R1 and an O. K. lamp to conductor 103, so that the O. K. lamp and the lamp L are both lighted to indicate that although the tubing is larger than ideal, it is of a size which is acceptable.

When the tubing being drawn is in the ideal size range, micrometer 53 is enabled to actuate switch arm 33 to break the circuit to the grid of tube A3 so that relay R3 becomes de-energized and thus opens the traced circuit for lamp L, so that only the O. K. lamp is lighted, thus indicating that the tubing is of the ideal size.

When the tubing being drawn is acceptable but under the ideal size range, the micrometer 52 is enabled to actuate the switch arm 32 to interrupt the circuit to the grid of tube A2, so that the relay R2 becomes de-energized and at its contacts completes an obvious circuit for the lamp S. When this lamp is lighted in conjunction with the O. K. lamp it is an indication that the tubing being drawn, although smaller than ideal, is of an acceptable size.

When the tubing being gauged is soo small, the micrometer 51 is enabled to actuate switch arm 31 so that relay R1 will become de-energized to, at its front contact, open the circuit of the O. K. lamp and at its back contact close a circuit for the clock 121 via conductor 112' and the back contact of relay R4, so that this clock measures the time during which the tubing being drawn is too small for use. Lamp S is lighted over the obvious circuit including the contacts of relay R2, thus indicating that the tubing being drawn is too small.

*Size control*

As previously mentioned, the control of the size of the tubing is determined by the amount of air supplied to its bore by valve 96. This valve is adapted to be operated by a shaded pole motor M which operates in one direction when one pair of its shading coils is shunted, and in the other direction when the remaining pair of its shading coils is shunted. The motor may also be operated to increase or decrease the air supply by manual actuation of push button 125 or 126. When button 125 is depressed a shunt circuit about shading coils 150 and 151 is established through conductor 131, the make contacts of push button 125 and conductor 133, whereupon the motor will operate in the proper direction to increase the air supply to pipe 95. By pressing push button 126, shading coils 152 and 153 are shunted over a circuit including conductor 131, the break contacts of push button 125, the make contacts of push button 126 and conductor 132. The push button control is provided, however, primarily to enable large corrective changes to be made, as may be required when changing from the drawing of one size range of tubing to another. As heretofore stated, the invention provides for automatically making corrective changes while the tubing being drawn is still within an acceptable size range.

Before describing the automatic regulating operations the timing device used in connection therewith will first be described. This device operates on the principle of charging a capacitor to a predetermined voltage and then discharging the same through a high resistance until the voltage of the grid of a vacuum tube connected to the capacitor drops to a point where the tube will conduct sufficient current to energize an associated relay. The timers as shown comprise vacuum tubes VT1 and VT2 and associated circuits. The timer VT1 is employed to delay an actual corrective change being made until the gauging apparatus has, for a predetermined time, passed tubing outside the ideal size range. The timing device employing tube VT2 serves the function of breaking up the corrective change into small increments. Since these timers are alike, a description of one will suffice. While the tubing being gauged is of ideal size, the grid bias capacitor 141 is precharged through grid rectification because the cathode is connected through resistance 146 to the same line; namely, line 106, as the anode, so that there can be no electron flow from the cathode to the anode. However, the grid is connected through capacitor 141 and resistance 142 to a preset point 145 of the potentiometer 144 which in series with a resistor 143 extends between the lines 100 and 106 of the A. C. source. Thus grid current will flow charging condenser 141 to almost the full peak difference in potential between the preset point 145 of the potentiometer and the line 100. This is because the resistance 146 is such that it represents but a small percentage of the resistance 142 that the voltage drop in resistance 146 may be included.

The timing operation is initiated by connecting the cathode of VT1 to the line conductor 100 which is via conductor 139, the contacts of relay R7, the lower contacts of relay R5 and conductor 103 or, alternatively, the lower contacts of relay R6. When this is done the cathode grid potential consists of negative direct-current voltage stored in condenser 141 superimposed on an inphase alternating-current voltage consisting of that portion of the voltage across the potentiometer between the preset point 145 and line 100. The time delay is determined by the decay of the voltage across capacitor 141 as it discharges through the resistance 142. Since these components are of fixed value, the time constant or cycle is fixed and the time is determined by the point at which the grid circuit is connected to the potentiometer so that the time delay may be varied by merely changing the set point 145.

The automatic corrective regulation of air supply is under the control of relays R5 and R6. Relay R5 is connected to conductors 103 and 128 in multiple with lamp S, and accordingly becomes energized whenever the lamp S is lighted to indicate that the size of tubing being drawn is below that desired. Thus, in the manner previously described in conjunction with the operation of lamp S, the relay R5 is energized by operation of the gauging apparatus when the size of the tubing is below that desired. Relay R5, upon operating, at its upper make contacts, closes a point or circuit member in an operating circuit for motor M, namely a shunt circuit about shading coils 150 and 151 and at its lower make contacts completes the previously traced circuit from the conductor 100 through conductors 102, 103, contacts of relay R5, and the break contacts of relay R7 and conductor 139 to the cathode of tube VT1, so that in the manner already described, the timing operation is initiated. If this circuit remains completed until condenser 141 has been wholly discharged that is, until completion of the predetermined cycle of the timer, then, relay R8 becomes operated and closes its middle contacts which constitute a second member in the prepared shunt circuit about the shading coil windings 150 and 151. This closure completes the motor operating circuit thus initiating operation of motor M which, in turn, operates the air controlled device, valve 96. This circuit extends from conductor 131 through break contacts of push buttons 125 and 126, conductor 149, the middle contacts of relay R8, the upper contacts of relay R5 to conductor 133. The motor M accordingly operates in the proper direction to increase the supply of air to pipe 95. Relay R8 also at its outer contacts closes a circuit through a lamp VO, which becomes lighted to indicate that the motor M is operating. Finally, relay R8 at its innermost contacts connects the cathode of tube VT2 directly to conductor 100 so that the condenser 162 starts discharging to measure the time of operation of motor M. When this time has expired, relay R7 becomes energized and breaks the previously traced circuit to the cathode of tube VT1. Accordingly, relay R8 is immediately restored, and whether or not a further corrective change is made, is made dependent on whether relay R5 continues to remain energized for the time required to again effect the energization of relay R8.

The relay R6 is in bridge of conductors 103 and 104 in multiple with lamp L, and accordingly, whenever the tubing being drawn is larger than ideal, relay R6 operates to initiate the same cycle of operations initiated by the operation of relay R5, except that relay R6 at its upper contacts completes a shunt about windings 152 and 153 of the shading coils so that if the motor is operated, it operates in a direction to decrease the amount of air supplied to pipe 95.

In the drawing of some sizes of tubing it may be found that one operating increment of valve 96 makes an over correction beyond the adjustable time range of the timer VT2. Under such conditions the modified arrangement illustrated in Fig. 7 may be employed. By supplying the greater percentage of air required through a by-pass valve 98, the sensitivity of control exercised by valve 96 can be reduced to meet the most critical needs.

From the foregoing it will be appreciated that the equipment under control of gauging rollers 11 and 12 is adapted to control the air supply to the tubing in such a precise manner that most corrective changes are made before the tubing attains a size outside the acceptable tolerances. It should be further understood that although the invention has been herein shown as applied to the drawing of a tubular body of material and varies the applied air pressure to exercise the regulation of the tubing size, the invention is equally adaptable to the drawing of a linear body of solid material. such as, for example, glass cane. Under these circumstances the motor M would be employed to actuate a rheostat in circuit with the motor employed to drive the tractor rolls 93 and 94 so that size control would be regulated by rate of draw rather than by change in air pressure.

The foregoing control apparatus may also be employed either alone or in combination with one or both of the foregoing arrangements to regulate the heat applied to the molten supply body, or to regulate the application of a heating or cooling medium to the material issuing from such body to regulate its viscosity as required to maintain a desired thickness range of the final product without departing from the spirit and scope of the invention.

What is claimed is:

1. In the method of continuously producing a linear body of material of a desired thickness range, the steps of passing the body through a gauging device for measuring the thickness of the body, said gauging device being positioned near the source of formation of the body and operatively connected to a timing device having a fixed predetermined cycle, initiating the operation of the timing device by operation of the gauging device when the thickness of the body is outside of the desired range and initiating a size correction of the body only after the timing device has completed its predetermined cycle and only when said thickness of the body as measured by said gauging device continues to be outside said desired range throughout said predetermined cycle.

2. A method such as defined by claim 1 wherein the linear body is composed of thermoplastic tubing issuing from a source of formation and maintained at a desired minimum size by air continuously supplied at a constant rate and size regulation is effected by variation of the volume of air via an auxiliary path.

3. For use with a thermoplastic tube-drawing machine wherein air is supplied to the tubing during the draw, a gauge through which the drawn tubing is passed, a timing device having a fixed predetermined cycle and operatively connected to the gauge, the operation of said timing device being initiated by operation of the gauge when the size of the tubing is outside of a desired range, an air control device adapted to increase the amount of air supplied when the tubing being gauged is below a predetermined minimum value and to decrease the amount of air supplied when the tubing being gauged is above a predetermined value, and means jointly controlled by said gauge and said timing device for initiating operation of said air control device only after the timing device has completed its predetermined cycle and only when said size of the tubing as measured by said gauging device continues to be outside the desired range throughout said predetermined cycle.

4. For use with a machine for continuous drawing of glass tubing from a supply body of molten glass and employing a source of compressed air supplied to the tubing to maintain a desired tube diameter, an air supply valve having an associated reversible motor operable to open and close said valve to regulate the diameter of the tubing being drawn, actuating circuits for said motor, separate relays having contacts included in said circuits, a third relay having contacts included in said actuating circuits, a timing device under control of each of said separate relays adapted to effect the energization of said third relay to complete an operating circuit for said motor after a predetermined time interval providing one of said separate relays is at the time also energized, and means including a gauge cooperative with the tubing being drawn for selectively effecting the energization of said separate relays as the tubing diameter varies beyond predetermined tolerances.

5. In an arrangement such as defined by claim 4, a second timing device having an operating circuit closed by said third relay on its energization, and a fourth relay operated by said second timing device at the expiration of a predetermined period having contacts included in the operating circuit of said first timing device so that said first timing device is disabled to disable the operating circuit for said motor after a predetermined time delay.

6. For use with equipment for the continuous fabrication of a linear body of material, an associated thickness gauging device through which the body passes, a timing device having a fixed predetermined cycle and operatively connected to the gauging device, the operation of said timing device being initiated by operation of the gauging device when the thickness of the body is outside of a desired range, mechanism for applying corrective adjustment to said equipment in small increments, and an operating circuit for said corrective mechanism including a circuit member closed only during passage through said gauging device of material outside the desired thickness range and a second circuit member closed only by the completion of said predetermined cycle of the timing device, effective operation of the corrective mechanism thereby being initiated only after the material passing through the gauging device continues to be outside the desired thickness range throughout said predetermined cycle of the timing device.

7. A gauging arrangement comprising a pair of gauging elements, independently movable supports for said elements, means tending to move said supports toward one another to bring said elements into continuous engagement with opposite sides of a linear body of material issuing from a source of fabrication thereof being passed therebetween, electrical circuit switching contacts associated with one of said supports, actuators for said contacts associated with the other of said supports and set to actuate a number of said contacts depending on the thickness of the body being passed between said elements, and means under control of certain of said contacts for modifying conditions at the source of fabrication to correctively change the thickness of the body being produced each time certain of said contacts remain actuated for a predetermined time period.

LEROY C. ARGYLE.

References Cited in the file of this patent

UNITED STATES PATENTS

| Number | Name | Date |
|---|---|---|
| 992,460 | Updegraff | May 16, 1911 |
| 1,013,396 | Johnson | Jan. 2, 1912 |
| 1,303,259 | Danner | May 13, 1919 |
| 1,409,907 | Abbott | Mar. 21, 1922 |
| 1,798,650 | Berlowitz | Mar. 31, 1931 |
| 1,941,924 | Arrault | Jan. 2, 1934 |
| 1,969,536 | Winne | Aug. 7, 1934 |
| 1,976,611 | Gulliksen | Oct. 9, 1934 |
| 2,150,017 | Barnard | Mar. 7, 1939 |
| 2,200,880 | Fox | May 14, 1940 |
| 2,317,468 | Krieger | Apr. 27, 1943 |
| 2,431,099 | Wiseman et al. | Nov. 18, 1947 |
| 2,433,585 | Warner | Dec. 30, 1947 |
| 2,514,847 | Coroniti et al. | July 11, 1950 |